(12) United States Patent
Wang et al.

(10) Patent No.: US 11,375,594 B2
(45) Date of Patent: Jun. 28, 2022

(54) TAPPED LINEAR DRIVER AND DRIVING METHOD

(71) Applicant: SIGNIFY HOLDING B.V., Eindhoven (NL)

(72) Inventors: Shan Wang, Shanghai (CN); Kelvin Wang, Shanghai (CN); Liang Shi, Shanghai (CN); Zhi Quan Chen, Shanghai (CN); John Dai, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/276,694

(22) PCT Filed: Sep. 3, 2019

(86) PCT No.: PCT/EP2019/073429
§ 371 (c)(1),
(2) Date: Mar. 16, 2021

(87) PCT Pub. No.: WO2020/057959
PCT Pub. Date: Mar. 26, 2020

(65) Prior Publication Data
US 2022/0030687 A1    Jan. 27, 2022

(30) Foreign Application Priority Data

Sep. 20, 2018 (WO) ............... PCT/CN2018/106704
Nov. 5, 2018 (EP) ................................. 18204444

(51) Int. Cl.
*H05B 45/48* (2020.01)
*H05B 45/397* (2020.01)
*H05B 45/50* (2022.01)

(52) U.S. Cl.
CPC .......... *H05B 45/48* (2020.01); *H05B 45/397* (2020.01); *H05B 45/50* (2020.01)

(58) Field of Classification Search
None
See application file for complete search history.

(56) References Cited

U.S. PATENT DOCUMENTS 8,278,837 B1    10/2012 Lenk
2010/0134018 A1*    6/2010 Tziony ............... H05B 45/37
                                                            315/122

(Continued)

FOREIGN PATENT DOCUMENTS

DE    102015105914 B3    8/2016
EP    2500737 A1    9/2012

(Continued)

*Primary Examiner* — Anh Q Tran
(74) *Attorney, Agent, or Firm* — Daniel J. Piotrowski

(57) ABSTRACT

A LED lighting circuit has a plurality of LED segments connected in series. A switching arrangement is used to selectively bypass at least one LED segment to implement a tapped linear driver approach. Degrading of a component in the LED lighting circuit is detected, so that a first TLD current modulation scheme is implemented when no such degrading is detected whereas a second current modulation scheme, different from the first current modulation scheme, is implemented to compensate for said degrading. Said degrading is leading to an increase in a turning on voltage of one LED segment, and compared to said first current modulation scheme, said second current modulation scheme has a higher voltage threshold at which said LED segment is switched. In this way, protection may be provided for circuit components and the light output may be maintained at the desired level in the event of component degrading, such as LED chip failure or contact resistance changes.

15 Claims, 13 Drawing Sheets

(56) References Cited

U.S. PATENT DOCUMENTS

| | | | |
|---|---|---|---|
| 2011/0266961 A1* | 11/2011 | Tsai | H05B 45/48 |
| | | | 315/185 R |
| 2012/0038615 A1 | 2/2012 | Leung et al. | |
| 2014/0361696 A1* | 12/2014 | Siessegger | H05B 45/395 |
| | | | 315/193 |
| 2016/0143100 A1 | 5/2016 | Miyoshi | |
| 2018/0213621 A1* | 7/2018 | Freer | H05B 45/355 |

FOREIGN PATENT DOCUMENTS

| | | | | |
|---|---|---|---|---|
| EP | 2713679 A2 | 4/2014 | | |
| WO | 2015195187 A1 | 12/2015 | | |
| WO | WO-2015195187 A1 * | 12/2015 | | B64D 11/00 |

* cited by examiner

TAPPED LINEAR DRIVER AND DRIVING METHOD

CROSS-REFERENCE TO PRIOR APPLICATIONS

This application is the U.S. National Phase application under 35 U.S.C. § 371 of International Application No. PCT/EP2019/073429, filed on Sep. 3, 2019, which claims the benefit of International Application No. PCT/CN2018/106704, filed on Sep. 20, 2018 and European Patent Application No. 18204444.6, filed on Nov. 5, 2018. These applications are hereby incorporated by reference herein.

FIELD OF THE INVENTION

This invention relates to tapped linear driver circuits, for example for driving a LED lighting load.

BACKGROUND OF THE INVENTION

Tapped linear drivers (TLDs) for LEDs are well known. Unlike switch mode drivers, they do not contain high-frequency switching elements that deteriorate the electromagnetic interference (EMI) performance of the driver.

In a stacked arrangement, the LEDs to be driven are arranged in a series string, with segments of the string selectively bypassed by respective bypass switches. Each segment typically comprises a series of individual LEDs. For a high power system with many LEDs, the segments are for example arranged as a set of parallel branches, each branch with multiple LEDs in series. The switching operations aim to match the mains voltage at different points in time during the mains period with the required LED forward voltage. By doing so the TLD maintains high efficiency that is comparable to a switch mode driver. However, the topology has a very simple circuit, low cost and low profile compared with a switch-mode converter.

The use of tapped linear drivers within a driver on board (DOB) platform is increasingly used in high power lighting systems such as road lights and entrance level high power systems. These high power systems require a large number of LED chips, so that each LED segment typically has two or more parallel branches of LEDs, each such branch may be described as a section of that segment.

Many topologies for TLDs are known. Typically, a rectifier is provided at the input for providing a fully rectified input to the TLD.

The basic stacked topology uses a single current source, and has bypass switches around respective LEDs or groups of LEDs. Voltage-based control of the bypass switches involves measuring the instantaneous input voltage and controlling the switches so that the input voltage and the LED voltages are matched. Current-based control of the bypass switches is based on the principle that the switches are normally closed, and only open when a current exceeds a certain pre-set level. In this way the switching occurs based on the current that flows through the switch.

In a high power system with many LED chips, if one LED chip breaks down for any reason, it leads to dark LEDs in the same series branch. This may arise due to thermal issues, static electricity, current surges, warping of the heatsink, moist ambient conditions, etc. Furthermore, LED chips in a parallel branch can be damaged by the increased current that they then have to conduct. In turn, the whole lighting system cannot be used.

US2012/0038615A1 discloses that a failed LED in a stacked topology is bypassed or combined with another LED such that the whole lighting circuit is will workable.

However the total lumen output of the lighting circuit will be lowered since the failed LED does not work anymore. This means the degrading of the lighting circuit causes underperformance and the prior art does not bring this performance back.

There are thus difficulties in adopting tapped linear drivers for some LED lighting applications.

SUMMARY OF THE INVENTION

WO2015195187A1 discloses that an aging degradation algorithm may be used to offset the aging effect of lumen depreciation of the LEDs.

It is a concept of the invention to adapt the timing or current amplitude of a TLD drive scheme in response to detection of component degradation. In this way, compensation may be provided for circuit components and the performance of the lighting circuit, such as the overall light output, flicker, total harmonic distortion (THD) and power factor (PF) may be maintained at the desired level in the event of component degrading, such as LED chip failure or contact resistance changes. Especially, the degrading is leading to an increase in a turning on voltage of one LED segment, and compared to said first current modulation scheme, said second current modulation scheme has a higher voltage threshold at which said LED segment is switched. Otherwise, a blank out duration would appear and make the THD/flicker worse.

The invention is defined by the claims.

According to examples in accordance with an aspect of the invention, there is provided a LED lighting circuit, comprising:
 an input adapted to receive a time-varying input voltage;
 a plurality of LED segments connected in series and to the input;
 a switching arrangement adapted to selectively bypass at least one LED segment in a plurality of time periods such that in each time period to match the forward voltage of the rest of the plurality of LED segments with an instantaneous amplitude of the input voltage; and
 a controller adapted to configure a current modulation scheme of the LED lighting circuit, wherein said current modulation scheme is adapted to determine both
 when the switching arrangement (S1-S4) to act to bypass at least one LED segment in each time period, and
 how much the amplitude of the current flowing through each of the LED segments in each time period;
 wherein the controller is adapted to:
 detect a degrading of a component in the LED lighting circuit;
 implement a first current modulation scheme when no such degrading is detected; and
 in response to detection of such degrading, implement a second current modulation scheme, wherein said second current modulation scheme is adapted to be different from the first current modulation scheme so as to compensate for an underperformance of the overall lighting circuit caused by said degrading used with the first current modulation scheme; wherein said degrading is leading to an increase in a turning on voltage of one LED segment, and compared to said first current modulation scheme, said second current modulation scheme has a higher voltage threshold at which said LED segment is switched.

The increased turning on voltage caused by degrading can result in periods when the LED does not conduct, giving a current discontinuity, if the original current modulation scheme is still used. For example, a degrading of a connection makes one LED segment turn on when the input reaches 130V, however the original current modulation scheme is still operating this segment (turning off a bypass switch of this LED segment) after 120V. There will then be no current between 120V and 130V since this LED segment is not conducting. This is not good in term of THD and flicker. The correction in the second current modulation scheme increases the voltage threshold from 120V to 130V, and enables a current continuity through the lighting circuit to be maintained. Note that between 120V to 130V, the previous LED segment still operates thus the current is continuous.

Wherein said degrading comprises a degrading of an electrical connection or LED chip aging. The degrading of an electrical connection may comprise a degrading of connection between a LED chip and a pad in the LED segment, leading to an increased impedance of the LED segment. The second current modulation scheme is then adapted to compensate for a current discontinuity as the underperformance in the first current modulation scheme in case of said increase in the turning on voltage of one LED segment.

The degrading can be detected by monitoring the forward voltage of the LED segments. Alternatively, it can be deduced by detecting the discontinuity of current, or by detecting a voltage dip across the linear current source circuit.

This circuit alters the current modulation scheme, by which is meant the current delivered to the LED segments in combination with the timing of operation of the switching arrangement, to compensate for degrading of a component. Depending on the nature of the degrading, it may for example result in a power drop or a current spike when the original current modulation is still used. The first current modulation scheme is for example a normal or default scheme which is used during normal operation of the system, in order to match the timing of operation of the different LED segments (and hence the overall forward voltage at any particular time) with the time-varying input. The second current modulation scheme may be considered to be a compensation scheme, which is used when a degrading of the circuit occurs, and reverses or suppresses the effect of the degradation on the circuit performance such as light output, flicker, THD or PF of the overall lighting circuit.

Each LED segment may comprise a plurality of parallel branches, each parallel branch comprising a plurality of LEDs in series. Thus, the circuit may have many LED chips (tens or even hundreds, for example between 50 and 500 LED chips) and the embodiment thus enables use of a TLD system within a high power LED lighting system.

In a first example, the degrading comprises failure of one or more LEDs in a failed LED segment, and said second current modulation scheme has a higher current amplitude for the current flowing through the other LED segments than said first current modulation scheme, to compensate for a decrease in the light output of the failed LED segment.

Thus, a failed LED chip (creating an open circuit) will prevent light output from a series connection of LEDs. The overall light output will thus reduce (even though an increased current will flow in other parallel branches. This increased current still needs to be limited by the derating current of the LED, thus the overall light output is not in this way restored to the original level. To compensate for this reduced light output, the overall current level for other LED segments (equivalently, combinations involving other LED segments) is increased such that the other segments, when being driven, emit more light than when in the original current modulation scheme, and the additional light output counteracts for the loss of light of the failed LED chip.

In one approach, the second current modulation scheme for example has a smaller conduction duration for the failed LED segment than said first current modulation scheme and the same conduction duration for the other LED segments. The reduced conduction duration for the failed LED segment is used to protect the non-failed parallel branches of that segment, which will experience an increased current due to the open circuit created in the failed LED branch.

In another approach, the second current modulation scheme has a smaller conduction duration for the failed LED segment and a smaller conduction duration for one or more of the other LED segments than said first current modulation scheme, and the same conduction duration for the remaining LED segments. Thus, the conduction duration may be altered for segments in addition to the failed segment.

For detecting when there is a failed LED, a monitoring circuit may be provided for detecting that a section of LEDs has failed (wherein a "section" may for example be one parallel branch in the at least two branches of an LED segment), comprising:

a diode arrangement in series with the section of LEDs;

an opto-coupler driven by the voltage across the diode arrangement;

an output circuit at the output of the opto-coupler for generating an output which represents an average current through the section of LEDs.

The output circuit for example comprises a low pass filter. Thus, a relatively constant output signal is generated, which changes when a periodic LED current (periodic because of the switching control of the TLD) stops and becomes zero (because of a failed LED chip). Note there are other known implementations to detect a failure of a LED.

In a second example, the lighting circuit may further comprise a buffer capacitor in parallel with each LED segment, and wherein said degrading comprises or further comprises a decrease in the capacitance of at least one buffer capacitor, wherein compared to said first current modulation scheme, said second current modulation scheme has a smaller duration of driving the associated LED segment and/or a lower current, and a longer duration and/or higher current for the remaining LED segments.

The second current modulation scheme is then preferably adapted to compensate for a flicker as the underperformance in the first current modulation scheme in case of said decrease in the capacitance of at least one buffer capacitor.

The capacitor degrading may have the effect of changing the switching times which result from the prevailing TLD control mechanism. These changes for example make the LED segment switch on and off earlier and/or switch off later. This can be detected by monitoring switching signals in the lighting circuit. The corrective action is then to adjust the switching times back to the desired durations. Another drawback of capacitor degrading is that it cannot smooth the LED current as it did before, thus increased ripple or flicker is caused in this segment. A solution is to reduce the current or activation duration to this segment to cause less flicker, while increasing the current or activation duration to other segments to maintain the same overall light output.

An increased current drive level may be desired to compensate for the smaller conduction duration. For a segment with a failed branch, this may result in currents through the non-failed branches which are too high. The bypass switch of that segment can be used to divert a portion of the increased current so as to avoid the non-failed branch of the segment being damaged or overheating. Thus, the switching arrangement may be further adapted to bypass a current from the LED segment with the degrading when the LED segment with the degrading and the remaining LED segments are in series connection and a higher current is injected to the remaining LED segments through the series connection.

The current modulation scheme and the second current modulation scheme preferably deliver the same average light output. Thus, the effect of the degrading is compensated such that the light output remains the same.

The lighting circuit may further comprise a diode bridge rectifier for converting an AC time-varying input into a DC time-varying input. Thus, the lighting system may be a driver on board (DOB) system.

The invention also provides a method of operating a LED lighting circuit, comprising:

receiving a time-varying input voltage and supplying the time varying input to a plurality of LED segments connected in series;

during the time-varying input voltage, selectively bypassing at least one LED segment in a plurality of time periods such that in each time period to match the forward voltage of the rest of the plurality of LED segments with an instantaneous amplitude of the input voltage; and configuring a current modulation scheme of the LED lighting circuit, wherein said current modulation scheme determines both when to bypass at least one LED segment in each time period, and how much the amplitude of the current flowing through each of the LED segments in each time period, wherein the method further comprises:

detecting a degrading of a component in the LED lighting circuit;

implementing a first current modulation scheme when no such degrading is detected; and in response to detection of such degrading, implementing a second current modulation scheme, different from the first current modulation scheme, wherein said second current modulation scheme is adapted to compensate for an underperformance of the overall lighting circuit caused by said degrading with respect to the first current modulation scheme; wherein said degrading is leading to an increase in the turning on voltage of one LED segment, and compared to said first current modulation scheme, said second current modulation scheme has a higher voltage threshold at which said LED segment is switched.

As explained above, the degrading may comprise a degrading of an electrical connection or LED chip aging leading to the increase in the turning on voltage of one LED segment, wherein said degrading of the electrical connection comprises a degrading of connection between a LED chip and a pad in the LED segment, leading to an increased impedance of the LED segment.

The current modulation scheme and the second current modulation scheme preferably deliver the same average light output.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
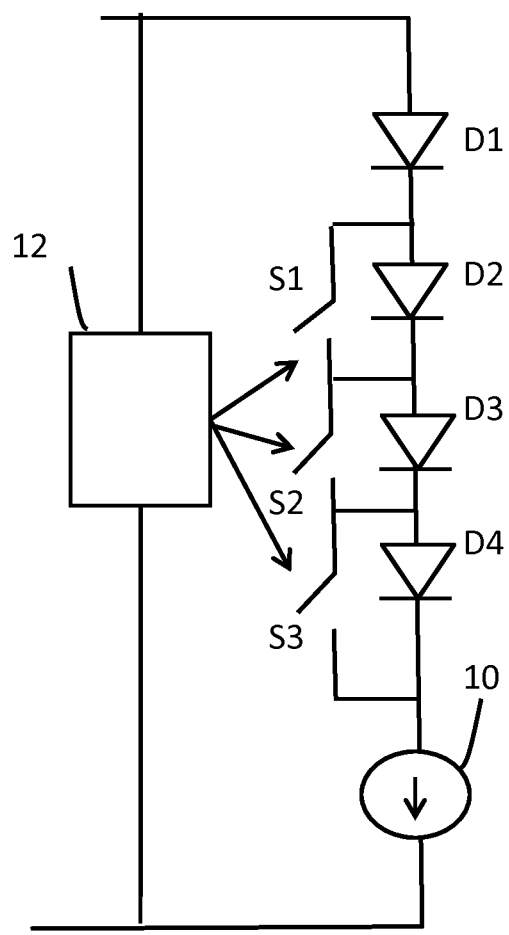
FIG. 1 shows a first known tapped linear driver (TLD) architecture.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a LED lighting circuit having a plurality of LED segments connected in series. A switching arrangement is used to selectively bypass at least one LED segment to implement a tapped linear driver approach. Degrading of a component in the LED lighting circuit is detected, so that a first TLD current modulation scheme is implemented when no such degrading is detected whereas a second current modulation scheme, different from the first current modulation scheme, is implemented to compensate underperformance of the LED lighting circuit due to said degrading used with the first current modulation scheme. In this way, protection may be provided for circuit components and the light output may be maintained at the desired level in the event of component degrading, such as LED chip failure or contact resistance changes.

FIG. 1 shows the basic stacked topology. It receives as input a full wave rectified mains signal. The rectifier is not shown, but typically comprises a diode bridge circuit. A single current source 10 draws current through the LED string, which has segments D1, D2, D3, D4. Each segment comprises one or more LEDs in series, and possibly also resistors.

The number of LEDs in each segment may be the same or different to the other segments, and they may each be a collection of LEDs of the same color (with different segments being different colors). Alternatively, all LEDs may be the same color, or the segments may have LEDs of different colors.

In this example, the second segment D2 to the last segment D4 each have a respective parallel bypass switch S1, S2, S3. The first segment D1 is always connected. The switches are operated to match the voltage across the LED string (i.e. those segments which are not bypassed) to the mains voltage at a particular point in time during each rectified half period of the mains voltage cycle. The current source 10 supplies the LEDs with the required current (preferably a sine wave for low total harmonic distortion) corresponding to the power that is to be delivered to the LEDs.

The difference between the instantaneous rectified mains voltage and the LED voltage of the connected segments is dropped across the current source 10. In this way, the energy is dissipated across the current source 10 and is defined as the product of the voltage and the current across the current source 10.

One approach for controlling the switches S1 to S3 is to provide voltage-based control of the switches using a controller 12. The instantaneous input voltage is measured by the controller 12 and the switches are switched in order to match the input voltage and the summed LED segment voltages. By doing so, the losses in the linear current source 10 are minimized. An alternative approach for controlling the switches S1 to S3 is to use current-based control. The bypass switches are normally closed and they open when a current exceeds a certain pre-set level. In this way, voltage information is not required and the switching occurs based on the current that flows through the switch.

Figure 2:
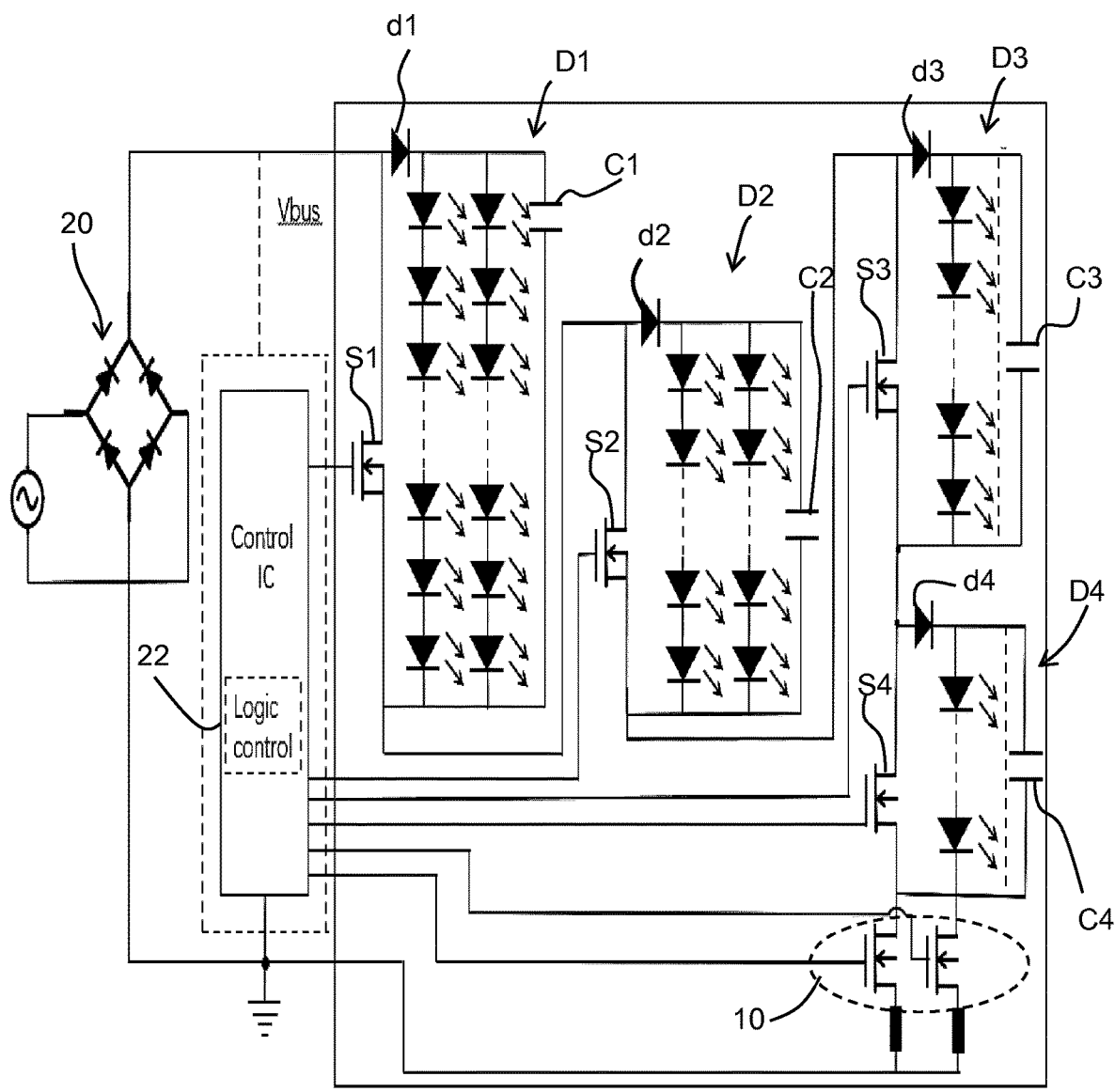
FIG. 2 shows a TLD architecture for high power lighting systems, in more detail.

FIG. 2 shows an example of a tapped linear driver for a road lighting application, based on a driver on board solution (in which AC power is supplied to the board which carries the LED chips).

The driver comprises a bridge rectifier 20 which converts an AC input to DC. The DC signal is used to generate a supply for a controller 22. In FIG. 2, the lighting arrangement comprises a set of lighting segments D1 to D4. Each lighting segment comprises multiple parallel branches of LEDs (wherein dashed lines in D3 and D4 represent LEDs which are not shown by diode symbols), and each branch having a set of LEDs in series. Each lighting segment in this example has a parallel bypass switch, S1 to S4 as well as a parallel storage capacitor C1 to C4. Thus, in this example, it is possible to bypass all of the lighting segments. Each lighting segment also include a series diode d1 to d4 to block the discharging current of the parallel storage capacitor through the bypass switch. The switches are implemented as field effect transistors, and their gate signals are provided by the controller 22.

The current source 10 is implemented by a transistor circuit, again controlled by the controller 22. This example shows two low cost transistors to implement the current source circuit, and they share the large current.

The invention involves monitoring degrading of a component in the lighting circuit. A first example is to monitor a failed LED (i.e. a failed LED chip) and for this purpose a circuit is provided for monitoring an LED failure in a series branch of LEDs.

Figure 3:
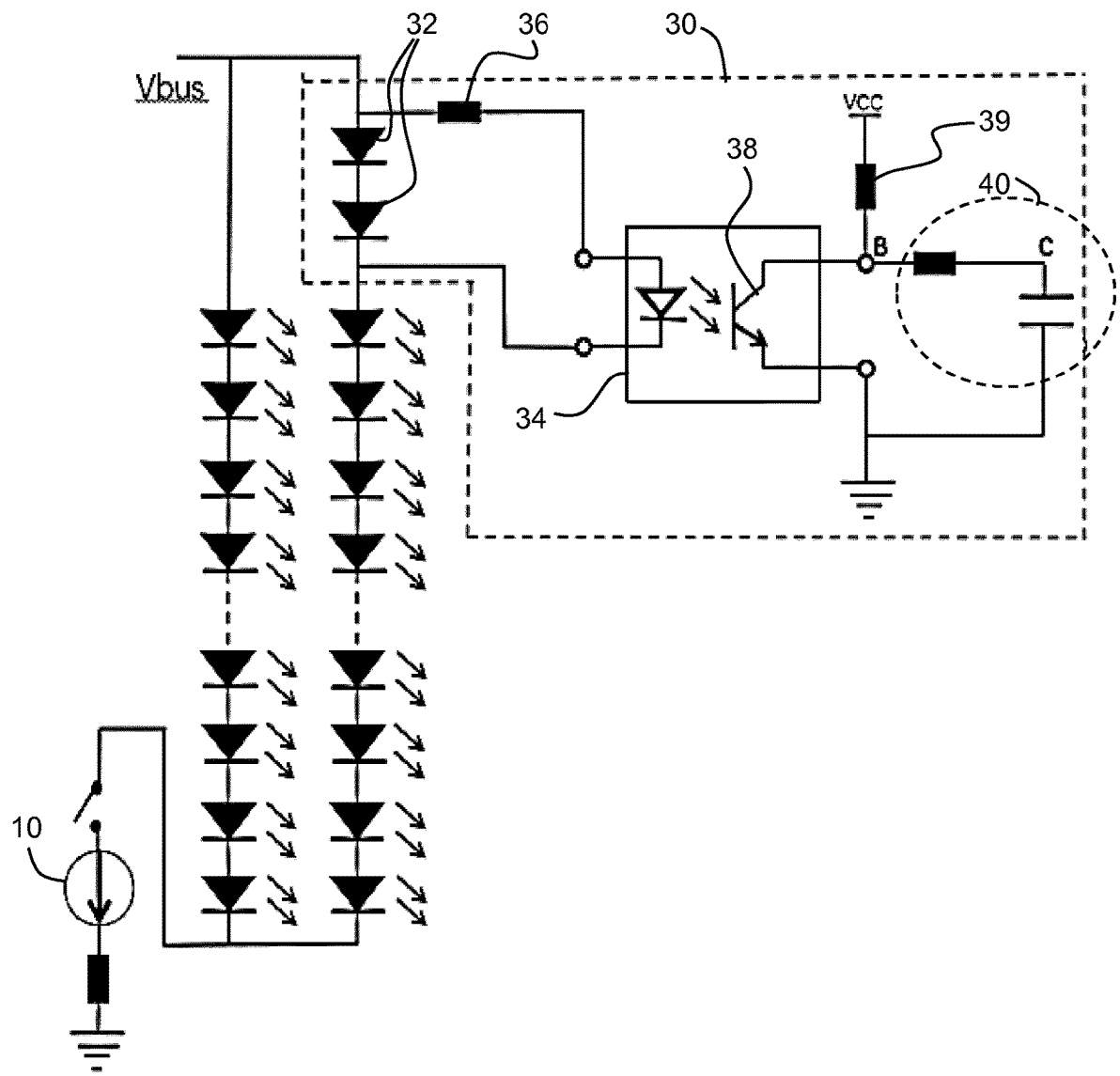
FIG. 3 shows a monitoring circuit.

FIG. 3 shows an example of the monitoring circuit 30 as applied to one branch (i.e. one section) of one of the lighting segments. This low cost circuit may be applied to each branch of each lighting segment.

The monitoring circuit comprises two diodes 32 in series with the series arrangement of LEDs being monitored. There may be one diode or more than two diodes. The purpose is to create a voltage drop which is sufficient to drive an opto-coupler 34. The opto-coupler draws a small current, limited by the value of a resistor 36, and when activated, the opto-coupler turns on an output transistor 38.

The output side of the opto-coupler has an output node B which is either pulled up to a bus voltage VCC through a resistor 39 when the output transistor 38 is turned off, or else pulled down to ground by the output transistor 38 when it is turned on. There is an RC filter 40 connected to the output node B, with an output of the RC filter at node C.

The opto-coupler is turned on when the LED string is functioning correctly, since a current is drawn through the diodes 32, which thus enable the opto-coupler to function.

Figure 4:
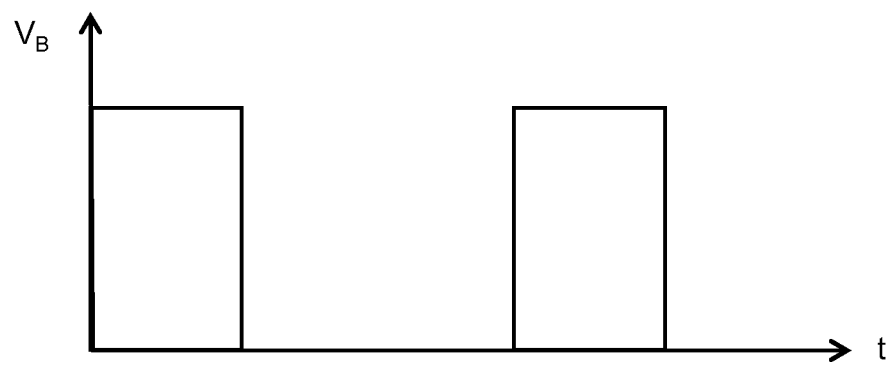
FIGS. 4 and 5 show timing diagrams to explain the operation of the monitoring circuit.
Figure 4:
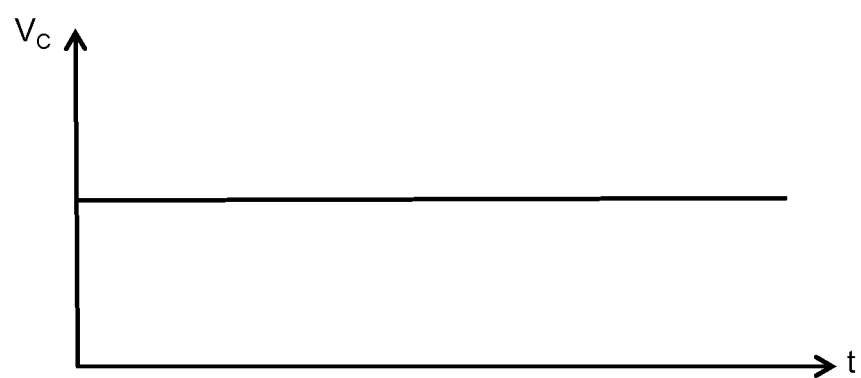

FIG. 4 shows as the top pane the voltage at node B over time. The opto-coupler is turned on cyclically based on the normal switching operation of the tapped linear driver. The opto-coupler is turned on when that particular LED string is turned on, i.e. when the bypass switch is turned off. The effect of the RC filter is that the voltage at node C is almost constant as shown in the lower pane. The RC time constant is thus much longer than the switching period of the tapped linear driver.

The switching period of one segment is for example in the range 1 ms-2 ms for a TLD with three segments. The RC time constant may for example be more than 10 ms. The more segments, the shorter the switching period.

Figure 5:

FIG. 5 shows the voltage at nodes B and C when there is a failed LED in the series chain, so that an open circuit is created. The nodes B and C are charged to the supply voltage VCC.

Figure 6:
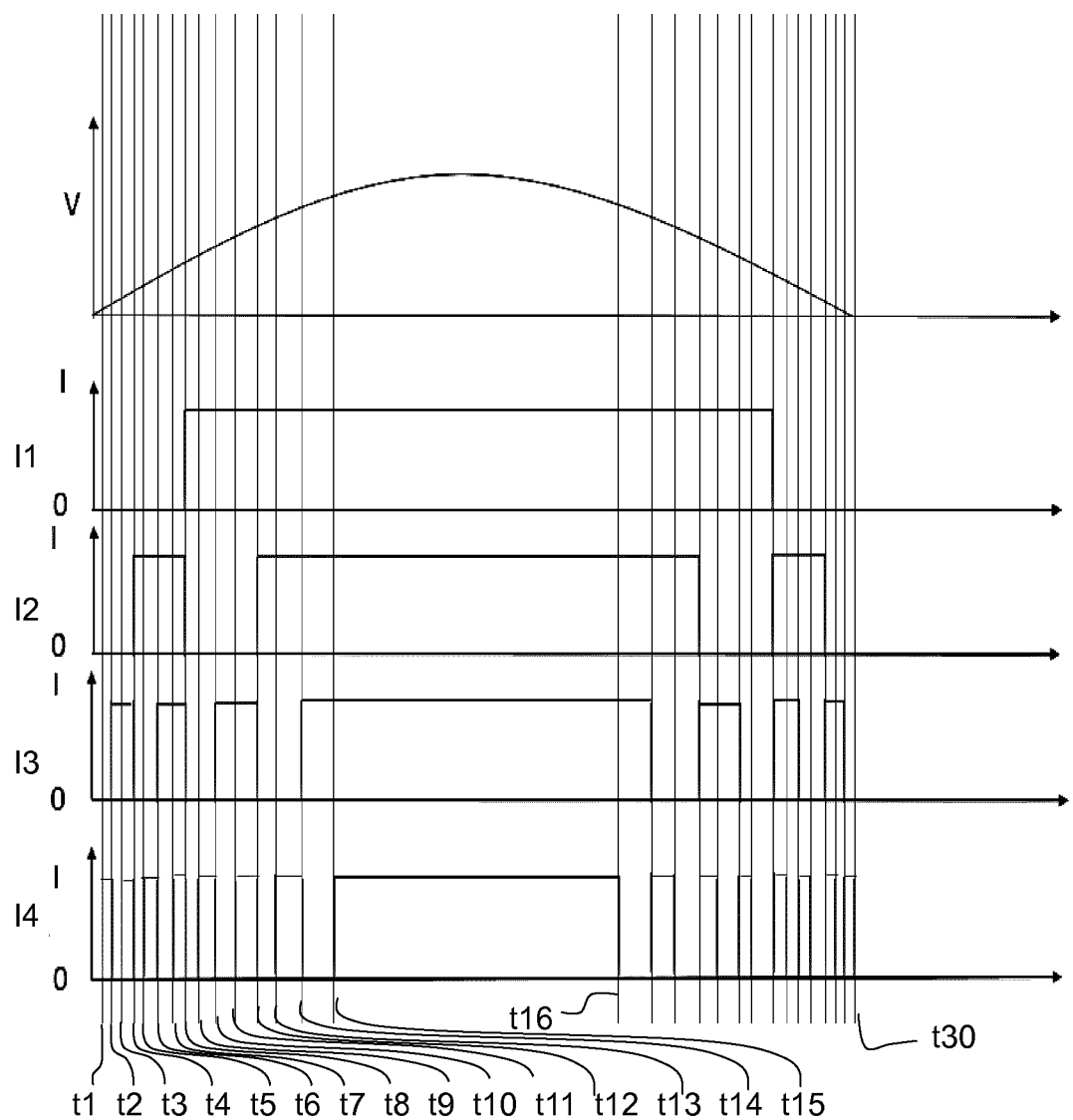
FIG. 6 is a timing diagram to show the normal operation of the circuit of FIG. 2.

FIG. 6 shows the operation of the circuit of FIG. 2.

The top pane shows one half-cycle of the mains AC input which is rectified by the rectifier.

The second to fifth panes show the currents I1 to I4 flowing through the first to fourth lighting segments D1 to D4. When a current flow, it indicates that the bypass switch is turned off, and when no current flows it indicates that the bypass switch is turned on. Thus, these panes also show the timing of operation of the bypass switches. It is voltage levels of the AC input which trigger the switching of the bypass switches.

The timing follows a binary sequence. Initially, all of the bypass switches are turned on. The voltage is dropped across the current source. The vertical lines show timing instants at which switching events take place. These timing instants correspond to a particular set of voltage levels of the AC voltage.

As soon as the input voltage is sufficient to reach the forward string voltage of the fourth lighting segment D4, at time t1, the bypass switch S4 is turned off so that current flows only through lighting segment D4.

The third lighting segment D3 has a larger forward voltage than the fourth lighting segment D4. As soon as the input voltage is sufficient to reach the forward string voltage of the third lighting segment D3, at time t2, the bypass switch S4 is turned on and the bypass switch S3 is turned off, so that current flows only through lighting segment D3.

As soon as the input voltage is sufficient to reach the forward string voltage of both the third and fourth lighting segments D3 and D4 in series, at time t3, the bypass switch S4 is turned back off, so that current flows through lighting segments D3 and D4.

The lighting segment D2 has a larger forward voltage than the combination of lighting segments D3 and D4. As soon as the input voltage is sufficient to reach the forward string voltage of the second lighting segment D2, at time t4, the bypass switches S3 and S4 are turned on and the bypass switch S2 is turned off, so that current flows only through lighting segment D2. The lighting segments D3 and D4 are again turned on in sequence. Lighting segment D4 is added at time t5, lighting segment D3 is added at time t6 with lighting segment D4 bypassed, and lighting segments D3 and D4 are both added at time t7.

The lighting segment D1 has a larger forward voltage than the lighting segments D2 to D4 in combination. As soon as the input voltage is sufficient to reach the forward string voltage of the first lighting segment D1, at time t8, the bypass switches S2 to S4 are turned on and the bypass switch S1 is turned off, so that current flows only through lighting segment D1.

The amplitude of the current is controlled by the current source circuit 10. In this case the current is generally constant. In other embodiments, the current can also be increased as the voltage increases such that the THD and power factor can be improved.

The binary sequence follows up to time t15 when all the lighting segments are turned on.

If the voltages are all added at each time instant, the shape corresponds to a stepped approximation to the shape of the AC voltage input. Thus, the lighting segments are switched in such a way that the combined string voltage follows the rectified input voltage.

The lighting segments are switched off in a symmetrical way with timing instants t16 to t30.

It can be seen that the lighting segments are arranged with different forward voltages, in particular following a binary sequence (1:2:4:8 in this example).

The monitoring circuit is used to detect a failed LED string (which may for example be one section, e.g. one of the parallel branches) of one of the segments, and the controller 22 uses this information to adjust the timing sequences of the bypass switches as well as the current set by the current source circuit. The aim is to protect the LEDs in other non-failed series segments and/or to ensure that the same output light intensity is achieved, so that there is no change to the user experience.

For example, if there is a LED chip breakdown in the one segment, the monitoring circuit enables the controller to control the total current (over time) provided to that segment (via control of the bypass switch). At the same time, the current to the other lighting segments can be adjusted, for example increasing the average current, to increase the total lumen output, and thereby cancel the lumen influence caused by the breakdown of the LED chip.

The current can be increased for the functioning LED chips provided that the increased current value remains below the rated LED current.

Figure 7:
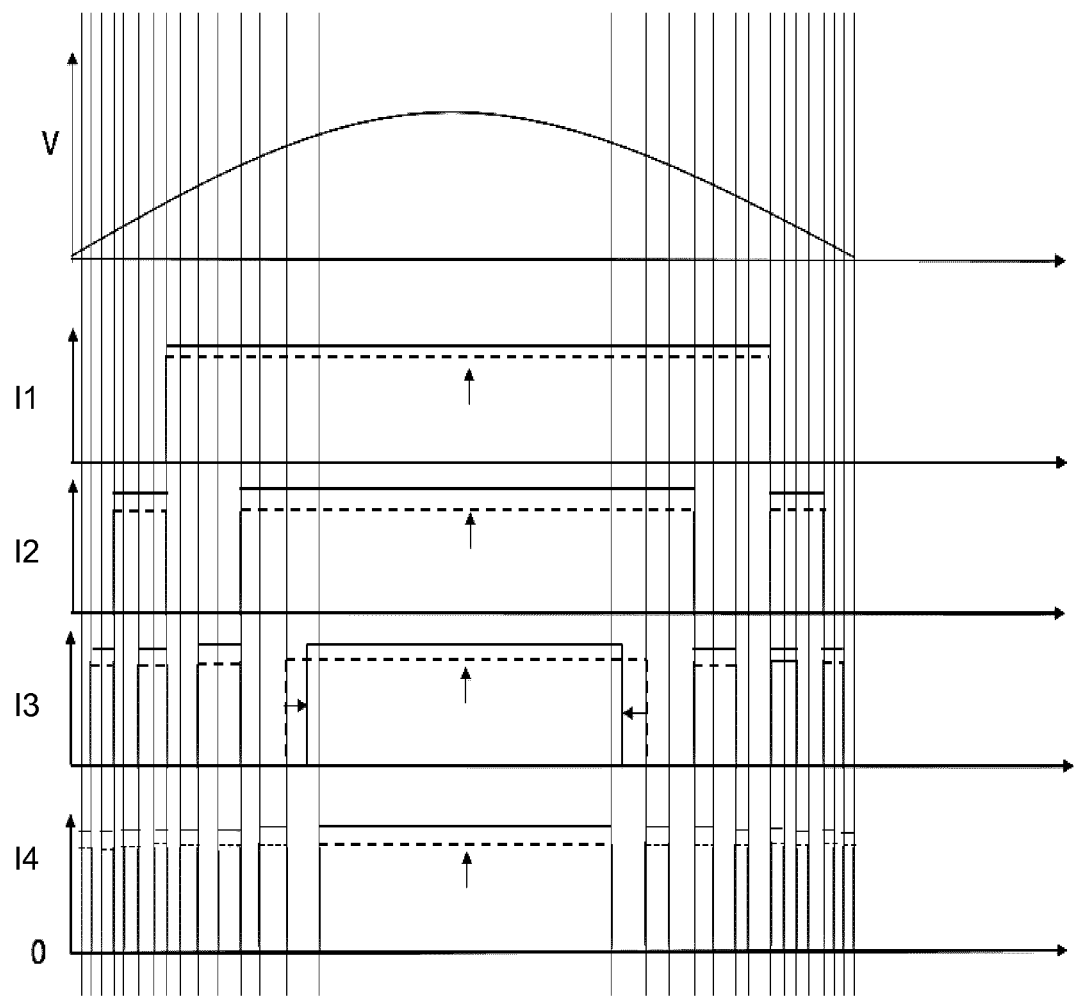
FIG. 7 shows a first way to modify the operation of the circuit of FIG. 2 to compensate for a failed LED section.

FIG. 7 shows a first method to adjust the control of the bypass switches in response to a detected fault in one of the parallel branches of the third lighting segment D3. The dashed lines show the waveforms of FIG. 6.

As shown, the current level is increased, as shown by the increase from the dash line equal to those in FIG. 6 to the solid line, through all lighting segments, since this corresponds to the current setting of the driver. The timing of the switching of the third bypass switch S3 is altered so that the third lighting segment is turned on for a reduced overall duration as seen in the current waveform 13. This is achieved by shortening the duration of the longer on-period during the peak of the rectified input. The turn on times for all other lighting segments remain unchanged. Note that this embodiment only reduces the last turn on duration of the third lighting segment D3. In alternative embodiment, any one or combination of the turn on durations of the third lighting segment D3 can also be reduced, such as t2 to t4, t6 to t8, t10 to t12 (and the corresponding times during the second half of the cycle).

In this way, the average current through the third lighting segment is reduced (because the time reduction is more significant than the increase in current) whereas the average current through all the other lighting segments is increased. The overall result may be designed such that there is no change in lumen output, taking into account the LEDs in the third segment which are not functioning. For example, the overall average current value may remain the same as well as the total lumen output over time. If the increased current is acceptable for the non-failed rest of the LED branches of the concerned LED segment, they can share it. This may happen if there are three, four or more LED branches in one LED segment. For example, this may arise if there are four branches in total, one branch fails, and the remaining three may well accept an increase in current by more than ⅓. However if there are only two branches in total, when one branch fails the remaining one may not accept an increase by more than 100%.

In this case the bypass switch may work in linear mode to bypass a portion of the total current. The switching arrangement is in this way further adapted to bypass a current from the LED segment with the degrading when the LED segment with the degrading and the remaining LED segments are in series connection and a higher current is injected to the remaining LED segments through the series connection.

Figure 8:
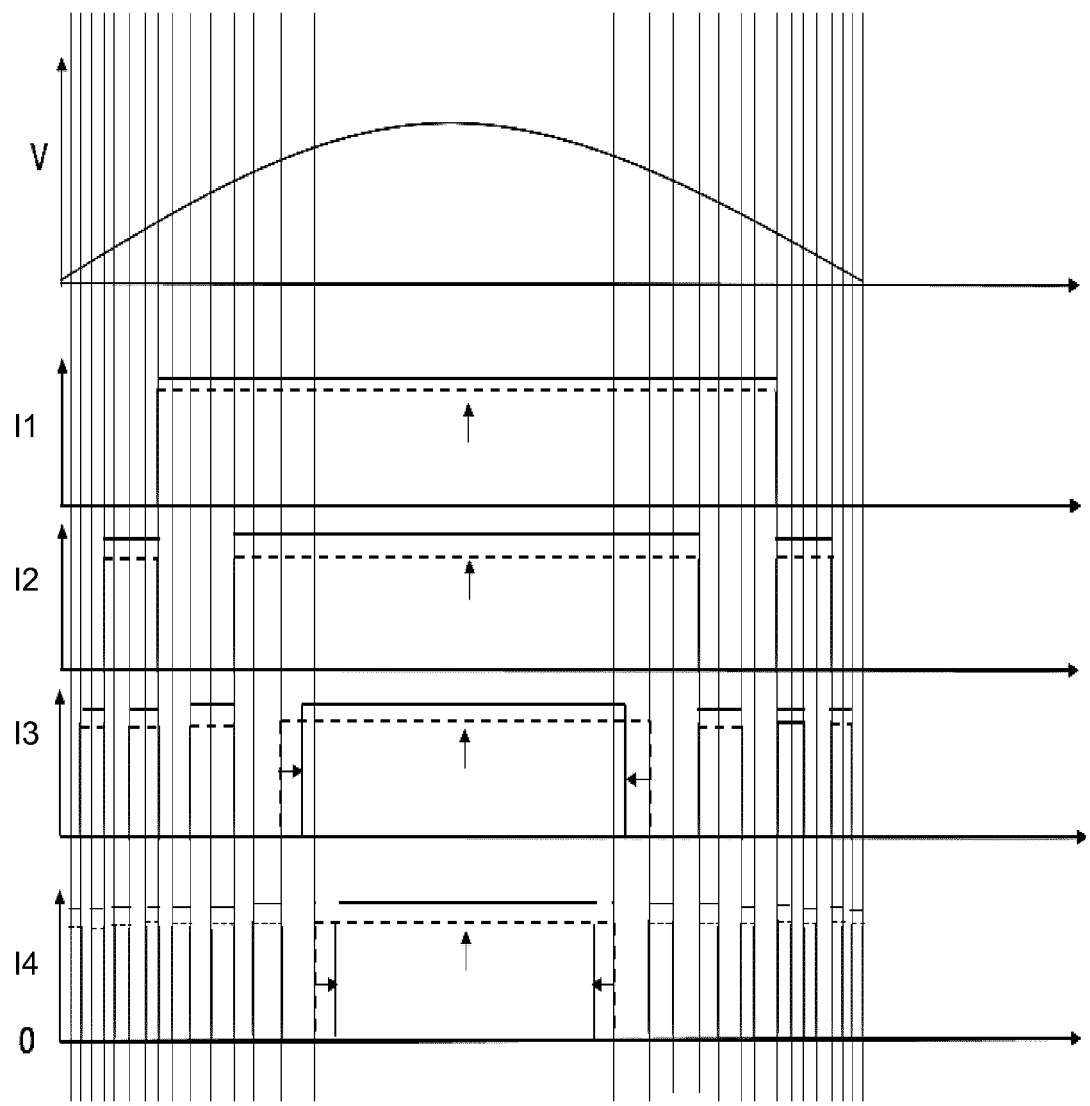
FIG. 8 shows a second way to modify the operation of the circuit of FIG. 2 to compensate for a failed LED section.

FIG. 8 shows a second method to adjust the control of the bypass switches in response to a detected fault in one of the parallel branches of the third lighting segment D3. The dashed lines again show the waveforms of FIG. 6.

As shown, the current level is increased through all lighting segments, since this corresponds to the current setting of the driver and current source circuit 10. The timing of the switching of the third bypass switch S3 is altered so that the third lighting segment is turned on for a reduced overall duration. Again, this is achieved by shortening the duration of the longer on-period during the peak of the rectified input.

In addition, the timing of the switching of the fourth bypass switch S4 is altered so that the fourth lighting segment is turned on for a reduced overall duration. Again, this is achieved by shortening the duration of the longer on-period during the peak of the rectified input. This may be desired, depending on the amount by which the current level is increased. The aim is for the overall average current value to remain the same as well as the total lumen output over time. Upon reducing the time duration for two of the lighting segments, the current level may need to be increased more than in the method of FIG. 7.

It can be seen that the invention extends the possible use of binary tapped linear driver solutions, for example to high power systems such as road lighting systems. It can be used to lengthen the lifetime of the lamp.

The description above relates to detection of a failed LED chip in an LED string. However, the monitoring may be used for other purposes.

Figure 9:
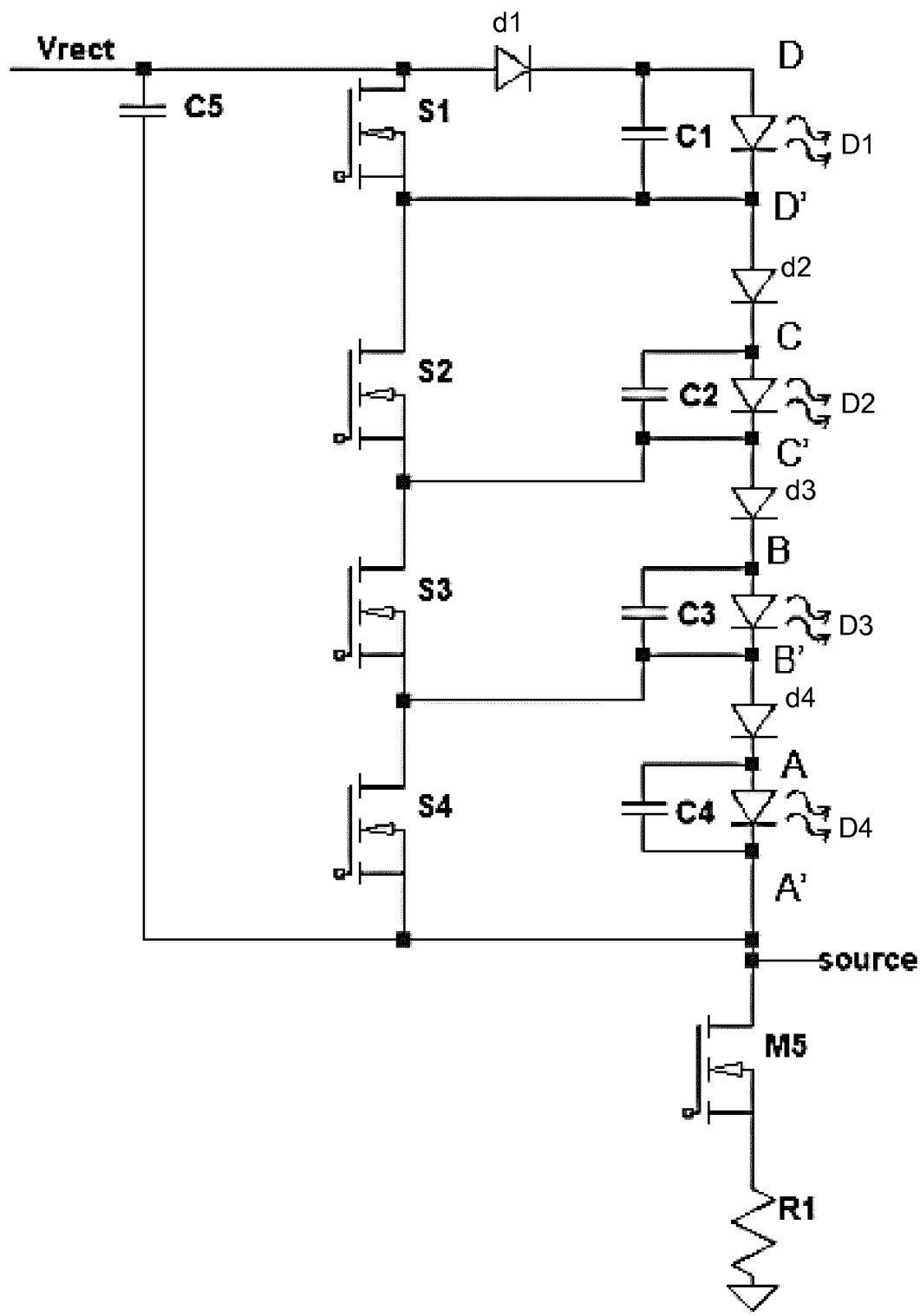
FIG. 9 shows a simplified TLD circuit for explaining other degrading issues.

For example, over time, the capacitance of the storage capacitors C1 to C4 may change, in particular reduce. This typically happens if the capacitors are electrolytic capacitors. Further sometimes poor soldering results in the capacitor disconnecting from the circuit and this is also considered to correspond to a reduction of capacitance in this patent application. This leads to a higher LED ripple current such that the peak LED current can exceed the current specification. The LED voltage (which is monitored to set the timing instants) and the drain-source voltage of the current source transistors 10 can be used to indicate the capacitance variation. For example, the LED voltage or the drain-source voltage varying faster than the original design (factory specification) may indicate that the buffering of the capacitor is reduced or failed due to the reduced capacitance. The rate at which current changes take place can also indicate this. In this way, the status of the capacitors can be detected. If the capacitor value reduces bellow a threshold level, dimming activity in that LED segment may be trigged to make sure the peak LED current does not exceed a limit, and the current to another LED segment may be increased thereby minimizing the resulting lumen drop due to dimming in that LED segment. FIG. 9 shows a simplified version of FIG. 2 to explain this function.

The current source is shown as a MOSFET M5, and a current sense resistor R1 is used for current sensing, and hence feedback control of the driver current level.

FIG. 9 is used to perform a simulation based on a change in the capacitance C1 to a smaller value. The voltage across D1, the switching of S1, and source voltage of the current source MOSFET M5 is recorded.

A smaller capacitance value results in a larger ripple voltage on D1. This larger ripple leads to a consequent large voltage variation on D1 (when S1 is off), and the source voltage of the current MOSFET M5, Vsource.

The relationship between then is described as following:

$$V\text{source} = V\text{rect} - VD1 - VD2 - VD3 - VD4;$$

$$VS1\text{off} = VD1 + 0.7 \text{(where 0.7 is the forward voltage of } d1\text{)};$$

Figure 10:
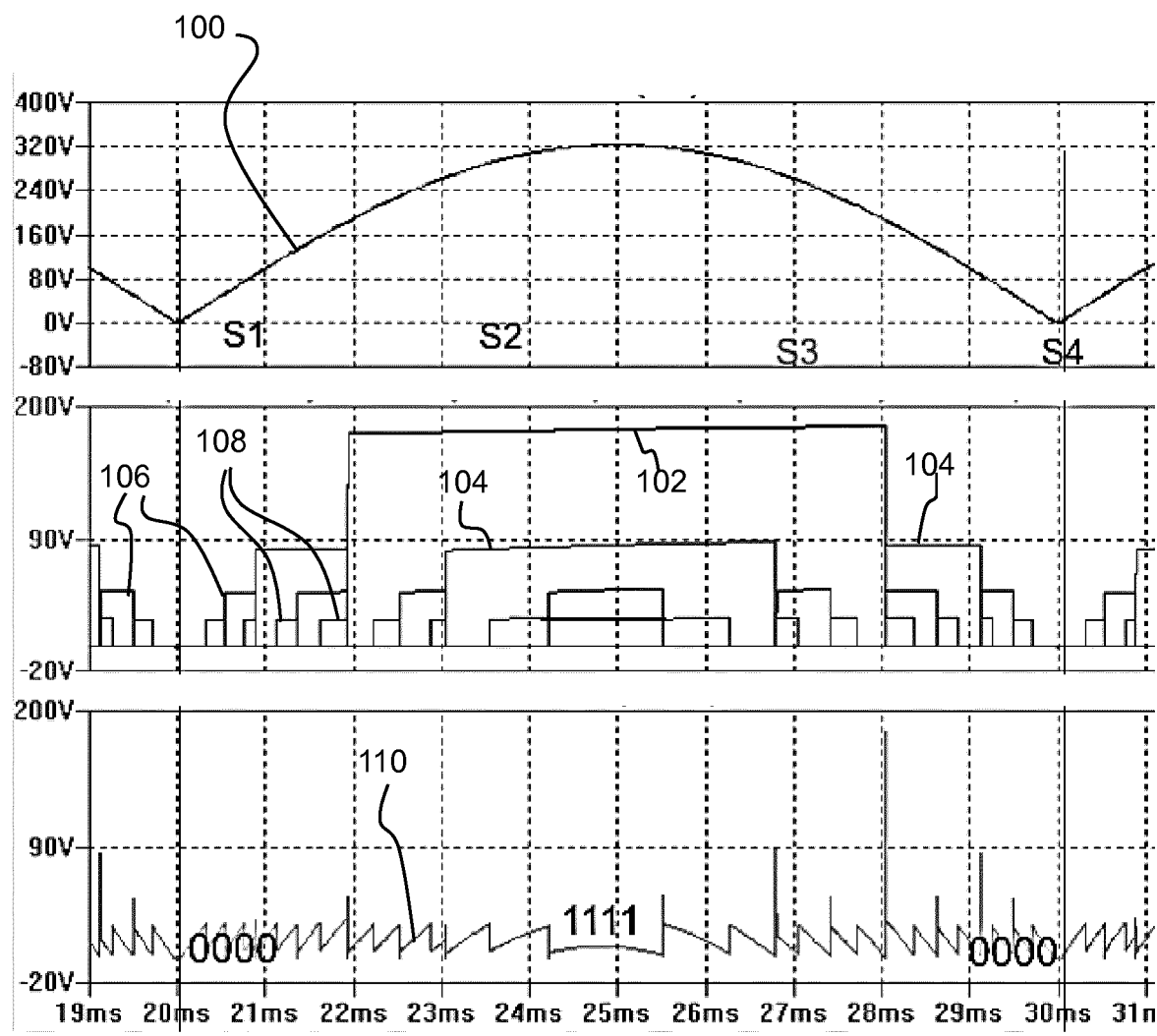
FIG. 10 is a timing diagram to show the normal operation of the circuit of FIG. 9.

FIG. 10 shows waveforms to explain the operation of the circuit.

Plot 100 is the rectified voltage. Plot 102 with highest amplitude is the timing of the turn on of the string D1 (i.e. the turning off of the bypass switch), plot 104 with the second highest amplitude is the timing of the turn on of the string D2, plot 106 with a lower amplitude is the timing of the turn on of the string D3, and plot 108 with a lowest amplitude is the timing of the turn on of the string D4. Zero means turning off the segment, non-zero value means turning on the segment. The same binary sequence as explained above can be seen.

The bottom pane 110 is the source voltage of the current source MOSFET M5.

Figure 11:
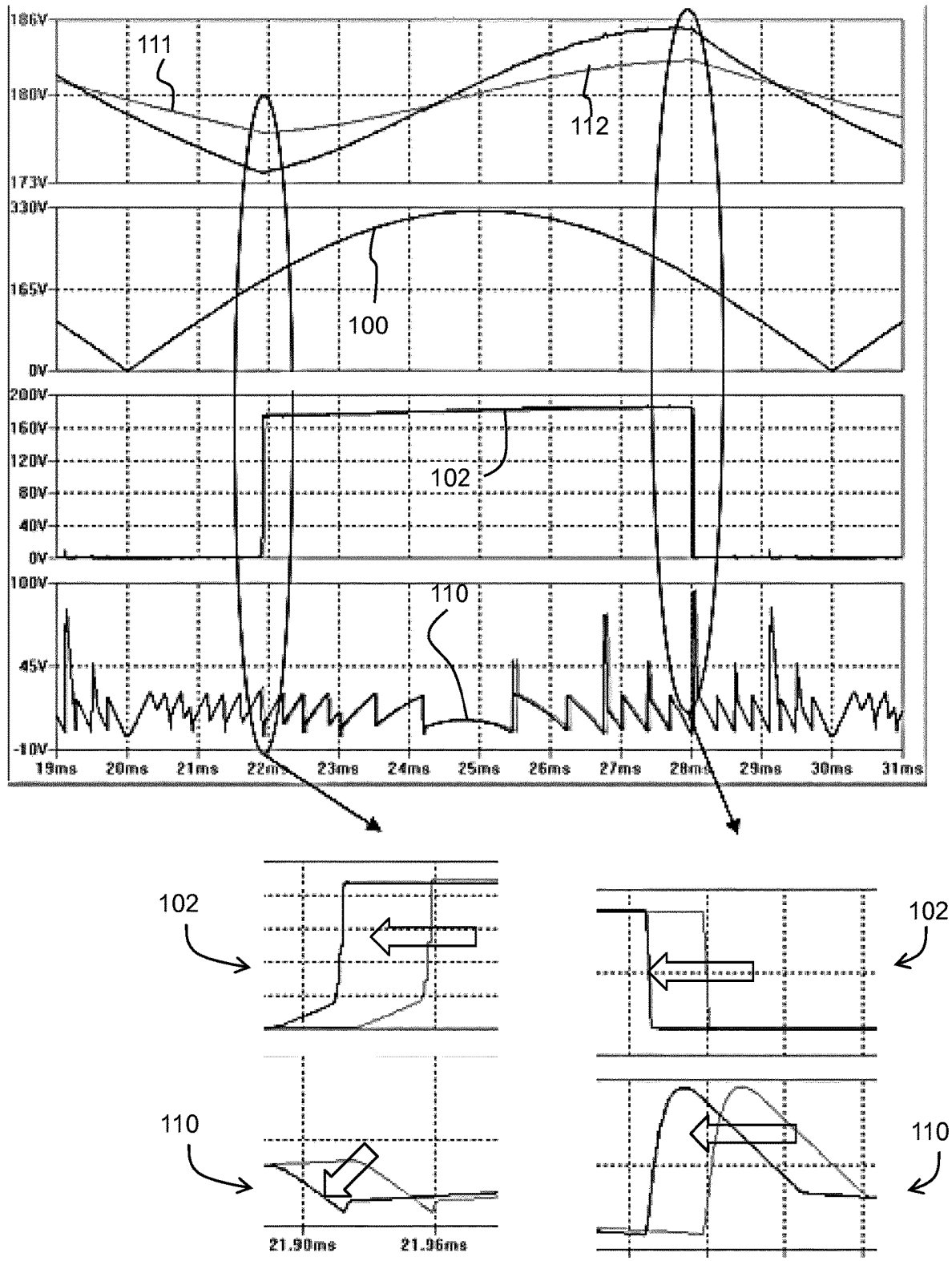
FIG. 11 is a timing diagram to show the how operation of the circuit of FIG. 9 is changed by a capacitance reduction.

FIG. 11 shows the effect of a reduction in capacitance C1.

The top pane shows the string voltage of the LED string D1. Plot 111 is for the original capacitance, and plot 112 is for the reduced capacitance.

The second pane is the rectified voltage 100.

The third pane shows a plot 102 of the timing of the turn on of the string D1 (in particular it shows the drain source voltage of the switch S1).

The fourth pane shows the source voltage as plot 110 of the MOSFET M5.

FIG. 11 also shows enlarged portions of the plots 102 and 110 at the turn-on time and turn off time of the switch S1. The arrows show how the waveforms shift from the previous capacitance value to the new lower capacitance value.

These plots show that when the capacitor experiences a reduction in capacitance (for example, C1 decreases from 68 uF to 47 uF), the minimum string voltage of D1 decreases at the rising edge of the switch signal S1 (as can be seen from plot 112), and the maximum voltage increases at the failing edge of S1 due to a larger ripple current. The turning on and off times of the switch S1 are also shifted earlier. This can be detected by using the rectified voltage as a reference.

Figure 12:
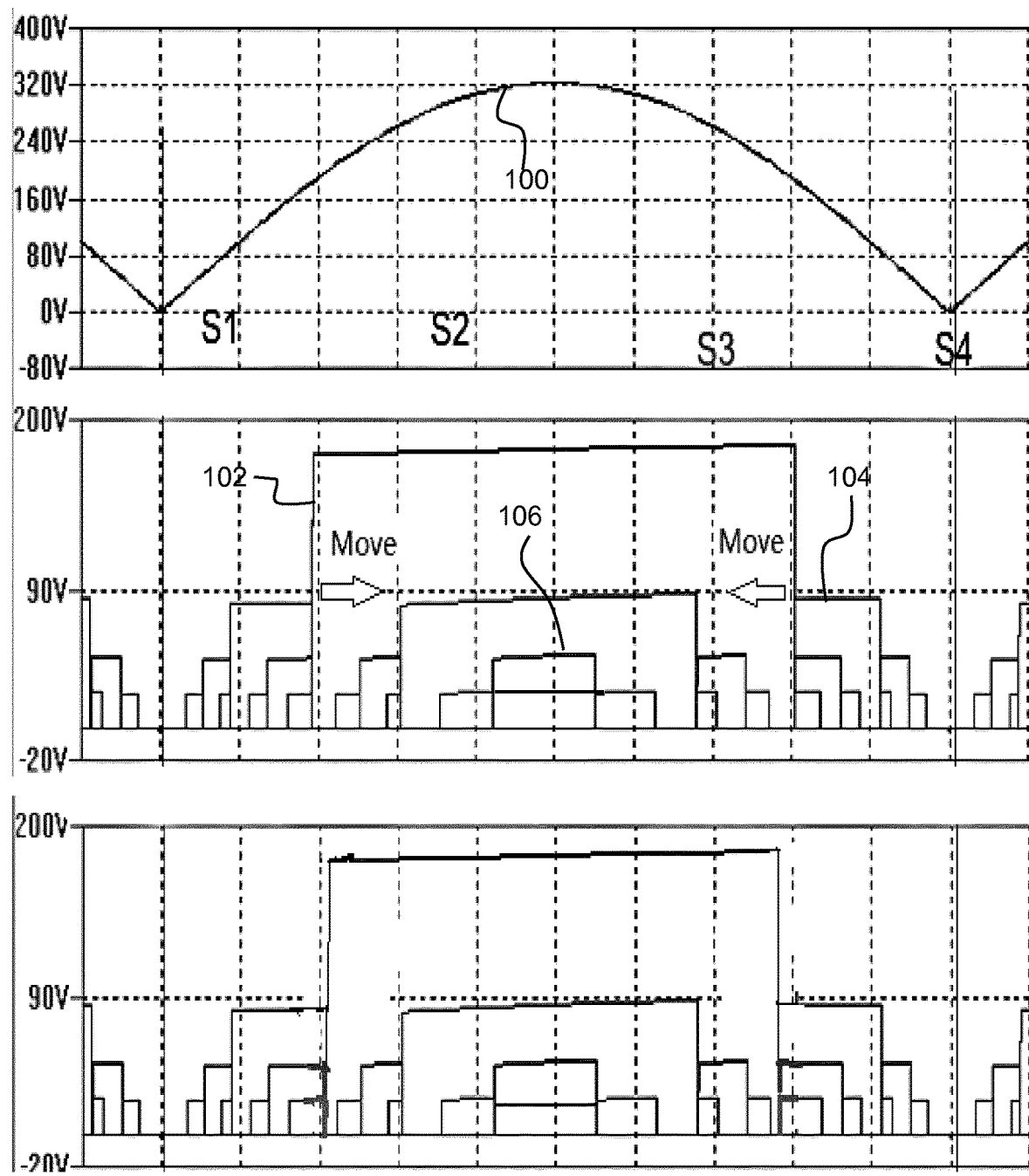
FIG. 12 shows a way to modify the operation of the circuit of FIG. 9 to compensate for the capacitance reduction.

FIG. 12 is used to show how compensation is carried out when the capacitance reduction has been detected.

The top pane shows the rectified voltage as plot 100. The second pane corresponds to the second pane of FIG. 10, and shows the timing of the control of the switches before the capacitance reduction.

The bottom pane shows the way the timing of the control of the switches is adapted in response to detection of a capacitance reduction in capacitor C1.

Plot 102 is adjusted by making the switch on time later and the switch off time earlier. This reduces the overall current through D1. The average current is optionally increased through the other lighting segments to compensate the reduction of current in D1 and keep the total lumen output same, by increasing their on times and increasing their currents (not shown in the timing diagram). During switching off of switch S1, the capacitor C1 is charged by the mains power and meanwhile D1 is powered by mains. During this period, the LED current increases. Also, the energy stored in C1 will be used to power D1 when S1 is later turned on.

In particular, the following equation is satisfied:

$$I1\text{off} * T\text{off} = I\text{led1} * T$$

I1off is the average current following into C1 and D1 during the time that S1 is off.

Iled1 is the average LED current for lighting segment D1.

Toff is the off time of switch S1 i.e. the time during which D1 is conducting.

T is half of power supply cycle.

This gives:

$$I\text{led1} = I1\text{off} * T\text{off}/T$$

To reduce the peak current of D1 for eliminating the side effect of the reduction in capacitance of C1, the time period Toff for the capacitor C1 should be shortened. Meanwhile to counteract the lumen dropping by D1, the on durations for D2 to D4 should be increased by extending Toff2 to Toff4.

The examples above relate to reducing capacitance values. Another issue is that during manufacture, for example as a result of poor soldering, the resistance between the LED pin and PCB pad may be larger than desired. Over time, oxidation of soldering pads may also increase the connection resistance. The result of these increased connection resistances is that one LED segment involving this connection needs a higher voltage to drive and hence make it conduct. Alternatively, the LED chip may age over time and its forward voltage may increase (however its lumen/current does not change). Abnormal forward voltage levels of the LED strings may be detected. Lightening surges may also result in damage having this effect (which is an issue for outdoor systems such as road lighting). If the current modulation scheme does not change, there may be a blank region wherein the input voltage is not enough to turn on this segment and there is no current flowing.

This situation can be detected based on the variation in forward voltage. As the rectified voltage remains unchanged, when the forward voltage increases, the voltage Vsource drops correspondingly (because Vsource=Vrect−VD1−VD2−VD3−VD4).

If the drop in Vsource does not cover the rise in forward voltage, there will be a visible dip/spike on the input current. This results in a reduction in power factor and total harmonic distortion. If the forward voltage rises to a certain threshold, the effect on the input current will be very large and will reduce the input and output power.

For example, if one segment has a voltage rise from 160V to 180V, there may be a corresponding drop in the source voltage of the current source from 31V to 13V. This voltage change may be detected as an indication of bad soldering or LED end of life.

Figure 13:
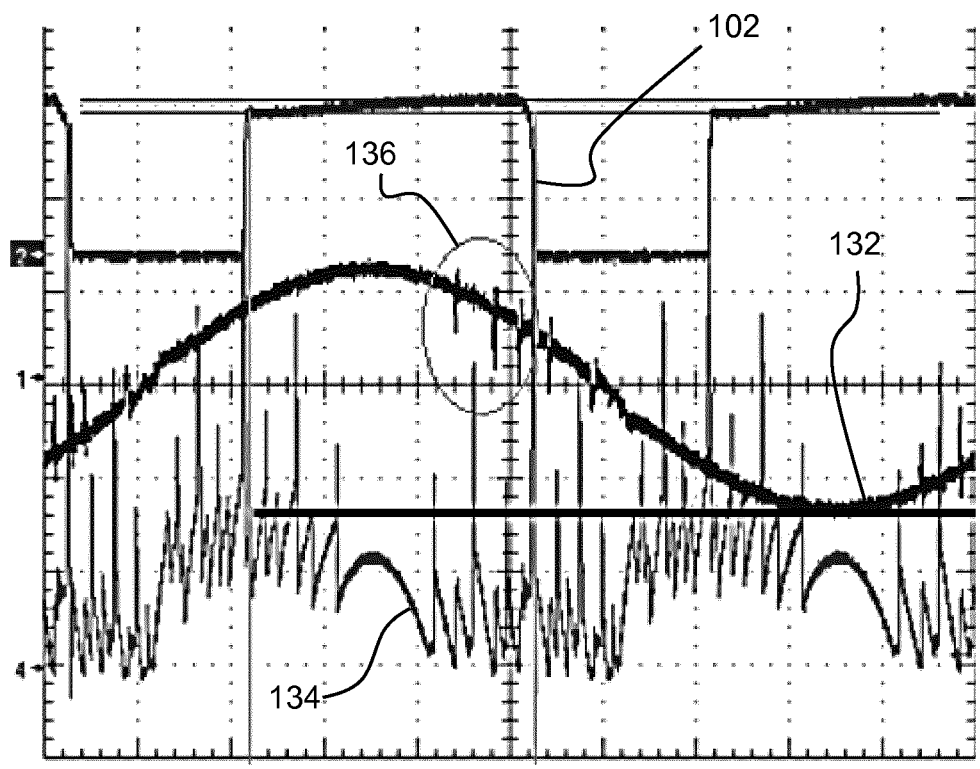
FIGS. 13 and 14 shows timing diagrams to explain the effect of a change in forward voltage of an LED section.
Figure 14:
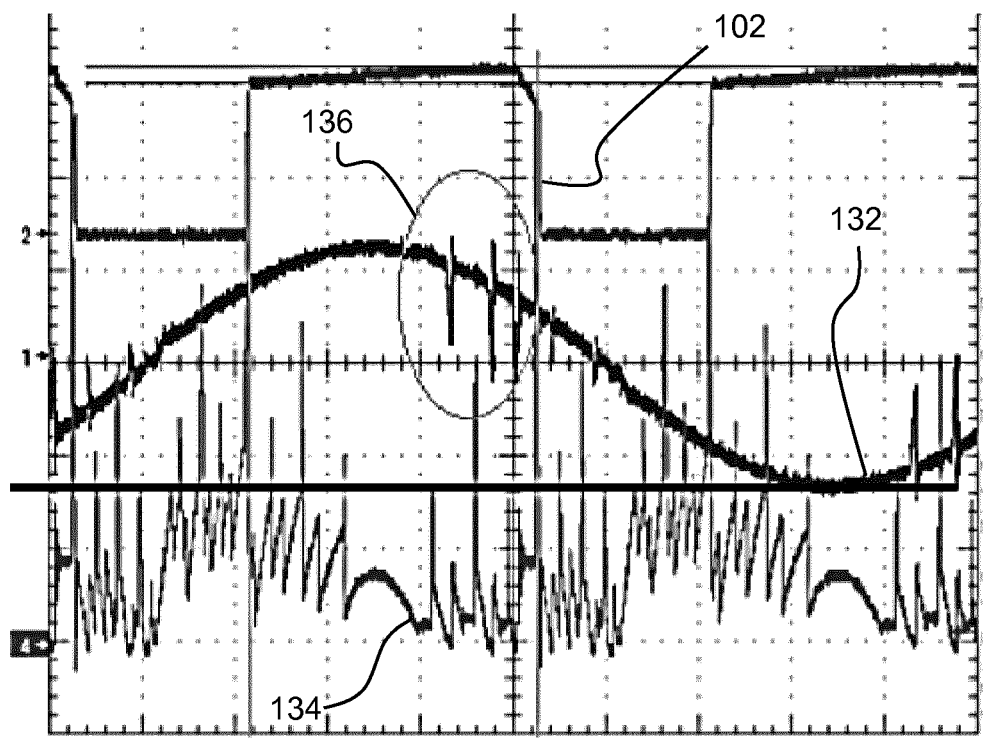

FIGS. 13 and 14 show the effect of an increase in forward voltage on the presence of current spikes.

The control voltage to switch S1 is shown as plot 102, the LED voltage is shown as plot 132 and the source voltage at the current source is shown as plot 134. Current spikes can be seen in the area 136. In FIG. 13, the forward voltage of the segment is 159V and it is increased to 171V in FIG. 14. There larger current spikes/dips indicate the non-conducting of the LED segment. The current spikes increase in size causing EMI and THD issues.

The source voltage is given by:

$$Vsource = Vrect - Vled1 - Vled2 - Vled3 - Vled4$$

For the lighting segment D1, during the time when S1 is off, the voltage response of Vsource decreases as the forward voltage of D1 increases. For example, when the forward voltage rises from 159 to 171V spikes in the current increase and these are harmful to EMI and THD. The reason is that during switching the following situation can arise:

$$Vled1 + Vled2 + Vled3 + Vled4 + Vsource > Vrect.$$

The current cannot flow to the LED when this condition is satisfied so there will be a sudden drop in current until Vsource reduces such as to compensate for the voltage rise of the forward voltage. Thus, a large rise in forward voltage leads to an unacceptable current drop in input current.

To compensate for this problem, when a forward voltage rise is detected, the switching voltage threshold of the switch S1 (for example) can be increased to avoid a sudden drop in input current.

Figure 15:
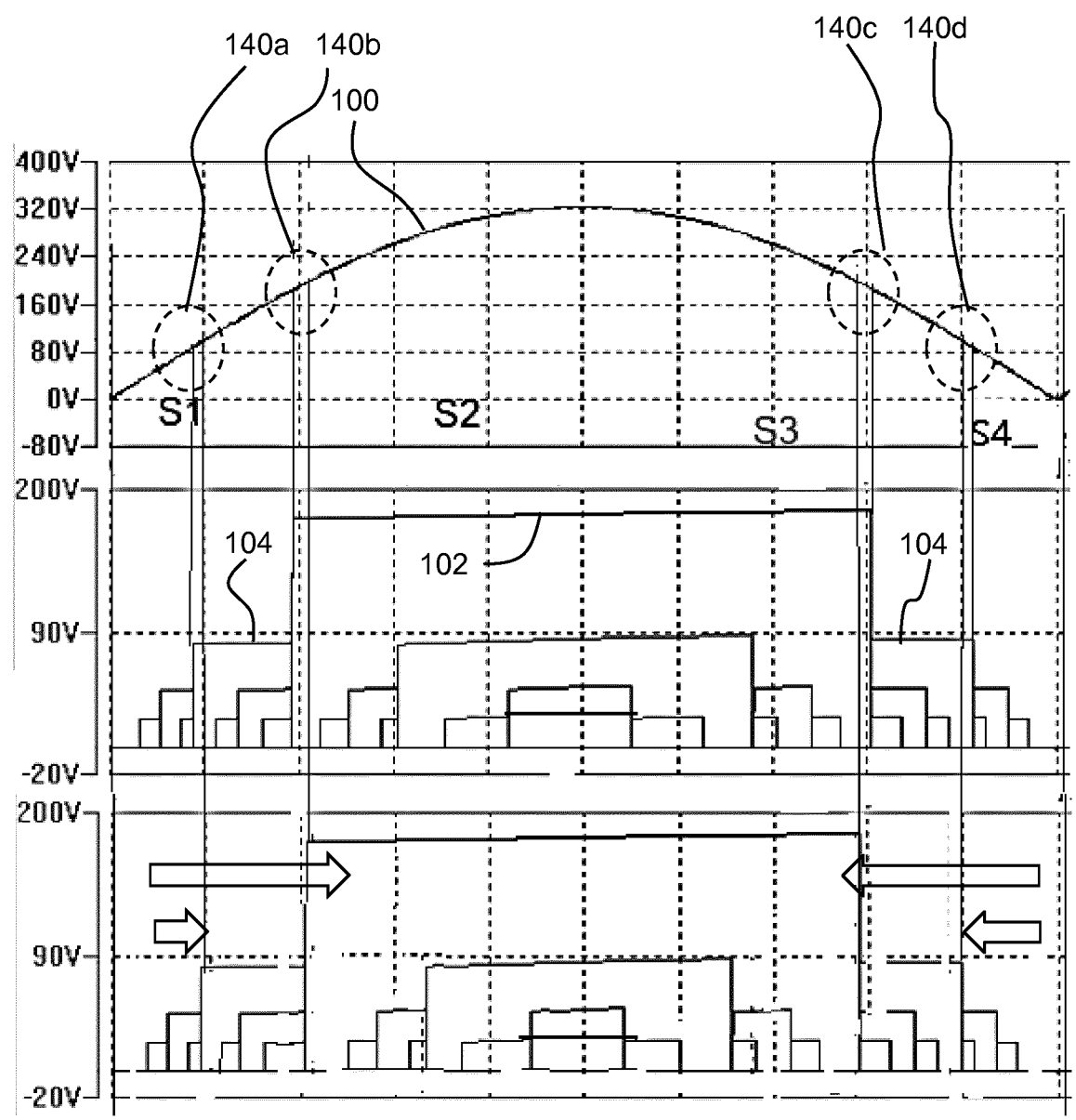
FIG. 15 shows a way to modify the operation of the circuit of FIG. 9 to compensate for the forward voltage change.

This operation is shown in FIG. 15.

The top pane shows the rectified voltage as plot 100. The second pane corresponds to the second pane of FIG. 10, and shows the timing of the control of the switches before the increase in forward voltage.

The bottom pane shows the way the timing of the control of the switches is adapted in response to detection of a forward voltage increase in lighting segment D1 which is the last segment to be turned on.

The voltages in the rectified voltage which trigger switching are increased (as shown by regions 140a to 140d). This may apply to all switching instants or only to a subset of switching instants.

In the example shown, the timing instants for the first two LED segments to be activated (segments D4 and D3) are almost maintained. Starting from the third LED segment to be activated (segment D2), the timing instants are shifted to the right (this is the first region 140a) namely with higher trigger voltages, and all timing instants starting with the last segment D1 also are shifted to the right namely with higher trigger voltages (this is the second region 140b). All timing instants before the turning off of the last segment to be activated (D1) at the third timing point 140c are shifted to the left, and then all timing instants before the turning off of the third segment to be activated (D2) at the fourth timing point 140d are shifted to the left. The timing instants for the first two LED segments are almost maintained. The end result is that the period 102 is shortened in time, and two of the periods 104 are shortened in time. The advantage of shortening the periods 104 is that this achieves a good power factor and THD, in the condition that the period 102 has also be shortened.

As the string LED voltage of segment D1 varies, the turning on/off points of the various switches are changed accordingly to provide smooth and continuous voltage control so that THD, PF and efficiency can remain at a high level.

The constant LED current is also adapted. It may be necessary to reduce the current so that the input power does not increase. Thus, the current may need to be reduced to protect the circuit from input power issues.

The increase in forward voltage may correspond to an increase in circuit efficiency, so that the output lumen may be maintained even with a lower current. Alternatively, the whole lamp may need to have a lumen drop to compensate for the increased contact resistance while avoiding a flicker issue.

Thus, different degradation issues may require different solutions. Some may enable the output lumen to be maintained (by increasing the drive current to compensate for a reduction in time duration or by decreasing the drive current due to an increase in circuit efficiency), but others may not maintain the output lumen if the aim is instead to avoid flicker or increase THD or PF. For example, by increasing the trigger voltage THD, PF and EMI issues are resolved since the current become continuous, but the current may need to be reduced to prevent input overpower, and the output lumen is thus reduced. If an increased input power is allowable, the may be increased to maintain the lumen so that all issues can be resolved while maintaining the output lumen.

The invention enables self-detection of the breakdown of a LED chip and the corresponding LED string, and can then maintain the total lamp's lumen output, by adjusting the different current of different LED string steps.

The invention is of interest for TLD solutions with a driver on board platform, for example in high power applications such as road lighting systems.

As explained above, different mechanisms are used for detecting degradation. For detecting LED chip failure a current sensing circuit is used. The circuit above is only one example of possible current sensing circuit. For detecting resistance or capacitance changes, voltage levels in the circuit and/or timing instants are monitored. This monitoring may be based on sensing already carried out in the circuit, for example monitoring the forward voltages of the LED segments, voltages associated with the current source, and timing of transitions when switching takes place.

Variations to the disclosed embodiments can be understood and effected by those skilled in the art in practicing the claimed invention, from a study of the drawings, the disclosure and the appended claims. The degrading as described above are examples and other types of degrading can be addressed by using the invention as well to compensate the underperformance. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or

The invention claimed is:

1. A LED lighting circuit, comprising:
an input adapted to receive a time-varying input voltage;
a plurality of LED segments connected in series and to the input;
a switching arrangement adapted to selectively bypass at least one LED segment in a plurality of time periods such that in each time period the forward voltage of the rest of the plurality of LED segments matches an instantaneous amplitude of the input voltage; and
a controller adapted to configure a current modulation scheme of the LED lighting circuit, wherein said current modulation scheme is adapted to determine both
at how much voltage threshold the switching arrangement acts to switch to bypass or not bypass at least one LED segment in each time period, and
how much the amplitude of the current flowing through the rest of the plurality of the LED segments in each time period is;
wherein the controller is adapted to:
detect a degrading of a component in the LED lighting circuit;
implement a first current modulation scheme when no such degrading is detected; and
in response to detection of such degrading, implement a second current modulation scheme, wherein said second current modulation scheme is adapted to be different from the first current modulation scheme so as to compensate for an underperformance of the overall lighting circuit caused by said degrading if the first current modulation scheme were still used;
wherein said degrading is leading to an increase in a turning on voltage of one LED segment, and compared to said first current modulation scheme, said second current modulation scheme has a higher voltage threshold at which a corresponding switch in the switch arrangement is adapted to switch to bypass or not bypass said LED segment.

2. A lighting circuit as claimed in claim 1, wherein each LED segment comprises a plurality of parallel branches, each parallel branch comprising a plurality of LEDs in series.

3. A lighting circuit as claimed in claim 1, wherein one LED segment comprises parallel branches of LEDs, said degrading comprises failure of one or more LEDs in one of the parallel branches in a failed LED segment, and said second current modulation scheme has a higher current amplitude for the current flowing through the other LED segments than that in said first current modulation scheme, to compensate for a decrease in the light output as the underperformance of the whole lighting circuit due to the failed LED segment used with the first current modulation scheme.

4. A lighting circuit as claimed in claim 3, wherein said second current modulation scheme has a smaller conduction duration for the failed LED segment than that in said first current modulation scheme and the same conduction duration for the other LED segments.

5. A lighting circuit as claimed in claim 3, wherein said second current modulation scheme has a smaller conduction duration for the failed LED segment and a smaller conduction duration for one or more of the other LED segments than those in said first current modulation scheme, and the same conduction duration for the remaining LED segments.

6. A lighting circuit as claimed in claim 3, comprising a monitoring circuit for detecting that the one or more LEDs have failed, comprising:
a diode arrangement in series with one parallel branch of one LED segment;
an opto-coupler driven by the voltage across the diode arrangement;
an output circuit at the output of the opto-coupler for generating an output which represents an average current through the parallel branch.

7. A lighting circuit as claimed in claim 1, further comprising a buffer capacitor in parallel with each LED segment, and wherein said degrading comprises or further comprises a decrease in the capacitance of at least one buffer capacitor, wherein compared to said first current modulation scheme, said second current modulation scheme has a smaller duration of driving the associated LED segment and/or a lower current of driving the associated LED segment, and a longer duration and/or higher current for the remaining LED segments.

8. A lighting circuit as claimed in claim 7, wherein said second current modulation scheme is adapted to compensate for a flicker as the underperformance in the first current modulation scheme in case of said decrease in the capacitance of at least one buffer capacitor.

9. A lighting circuit as claim in claim 3, wherein the switching arrangement is further adapted to bypass a current from the LED segment with the degrading when the LED segment with the degrading and the remaining LED segments are in series connection and a higher current is injected to the remaining LED segments through the series connection.

10. A lighting circuit as claimed in claim 1, wherein said degrading comprises a degrading of an electrical connection or LED chip aging leading to the increase in the turning on voltage of one LED segment, and
the detector is adapted detect the increase in a turning on voltage by:
monitoring the forward voltage of the LED segments,
detecting the discontinuity of current when a switch, corresponding to the LED segment, in the switch arrangement is switched, or
detecting a voltage dip across a linear current source circuit in series with the LED segments when a switch, corresponding to the LED segment, in the switch arrangement is switched.

11. A lighting circuit as claimed in claim 10, wherein said degrading of an electrical connection comprises a degrading of connection between a LED chip and a pad in the LED segment, leading to an increased impedance of the LED segment, and
said second current modulation scheme is adapted to compensate for a current discontinuity as the underperformance in the first current modulation scheme in case of said increase in the turning on voltage of one LED segment.

12. A lighting circuit as claimed in claim 1, wherein the first current modulation scheme and the second current modulation scheme deliver the same average light output.

13. A lighting circuit as claimed in claim 1, further comprising a diode bridge rectifier for converting an AC time-varying input into a DC time-varying input.

14. A method of operating a LED lighting circuit, comprising:
receiving a time-varying input voltage and supplying the time varying input to a plurality of LED segments connected in series;

during the time-varying input voltage, selectively bypassing at least one LED segment in a plurality of time periods such that in each time period the forward voltage of the rest of the plurality of LED segments matches an instantaneous amplitude of the input voltage; and configuring a current modulation scheme of the LED lighting circuit, wherein said current modulation scheme determines both at how much voltage threshold to bypass or not bypass at least one LED segment in each time period, and how much the amplitude of the current flowing through the rest of the plurality of the LED segments in each time period, wherein the method further comprises:

detecting a degrading of a component in the LED lighting circuit;

implementing a first current modulation scheme when no such degrading is detected; and in response to detection of such degrading, implementing a second current modulation scheme, different from the first current modulation scheme, wherein said second current modulation scheme is adapted to compensate for an underperformance of the overall lighting circuit caused by said degrading if the first current modulation scheme were still used;

wherein said degrading is leading to an increase in the turning on voltage of one LED segment, and compared to said first current modulation scheme, said second current modulation scheme has a higher voltage threshold at which said LED segment is bypassed or not bypassed.

15. A method as claimed in claim 14, wherein said degrading comprises a degrading of an electrical connection or LED chip aging leading to the increase in the turning on voltage of one LED segment, wherein said degrading of the electrical connection comprises a degrading of connection between a LED chip and a pad in the LED segment, leading to an increased impedance of the LED segment.

* * * * *